United States Patent [19]
Parker

[11] Patent Number: 4,474,061
[45] Date of Patent: Oct. 2, 1984

[54] SONIC PRESSURE VOLUME MEASURING DEVICE

[75] Inventor: Norman W. Parker, Wheaton, Ill.

[73] Assignee: Motorola, Inc., Schaumburg, Ill.

[21] Appl. No.: 325,401

[22] Filed: Nov. 27, 1981

[51] Int. Cl.³ .................. G01F 9/00; G01F 23/28
[52] U.S. Cl. ........................ 73/149; 73/290 B; 73/290 V; 73/114; 73/861
[58] Field of Search .............. 73/290 B, 290 V, 149, 73/114, 861

[56] References Cited
U.S. PATENT DOCUMENTS
| | | | |
|---|---|---|---|
| 3,075,382 | 1/1963 | Mathias | 73/149 |
| 3,237,451 | 3/1966 | Haeff | 73/149 |
| 4,020,683 | 5/1977 | Young | 73/114 |

FOREIGN PATENT DOCUMENTS
197711 11/1977 U.S.S.R. ................ 73/290 B

*Primary Examiner*—James J. Gill
*Attorney, Agent, or Firm*—Margaret Marsh Parker; James W. Gillman; James S. Pristelski

[57] ABSTRACT

The volume of gases in a container or the volume of liquid in the container is determined by creating cyclic pressure waves in the gases and detecting the waves by a second transducer. The signals produced by the second transducer are a function of the volume of gas in the container, and the volume of any liquid can be obtained by simple calculation. The signals can also provide detection of an open container and, when coupled to signals relating to the velocity of a vehicle, can provide other data such as a miles-per-gallon reading.

7 Claims, 6 Drawing Figures

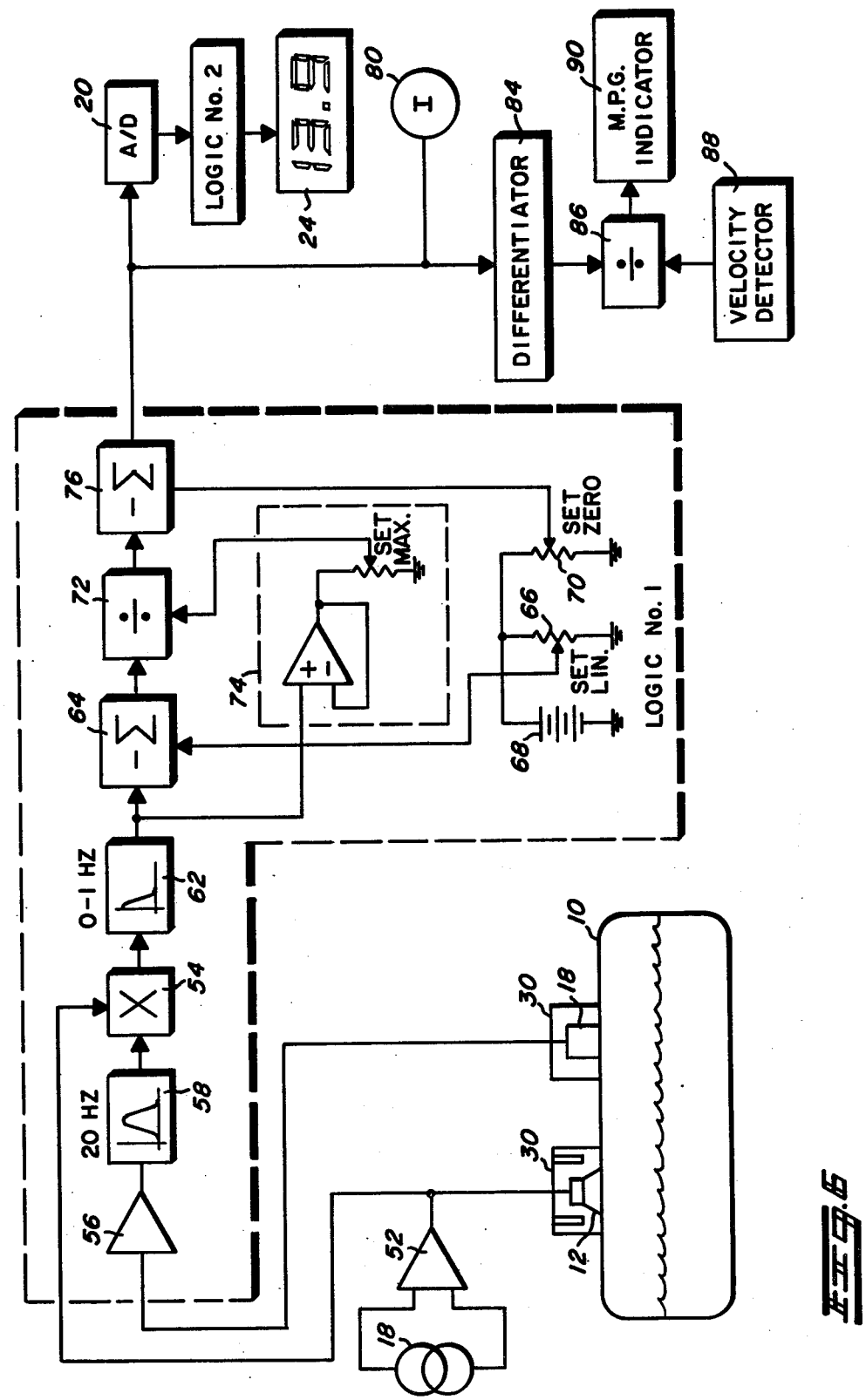

SONIC PRESSURE VOLUME MEASURING DEVICE

BACKGROUND OF THE INVENTION

The invention relates to the field of fluid or gas volume measurement and, more particularly, to a highly accurate measurement of fluid level under adverse conditions.

The measure of the fluid level in a container, particularly in a irregularly shaped container, can be accomplished by measuring the volume of gases above the liquid and subtracting from the known total volume of the container. Therefore, the same method may be used for measuring the volume of a gas or a liquid.

The measurement of fluid levels as in the gasoline tank of a vehicle has relied, almost exclusively, on some type of float device coupled to a potentiometer. While such an arrangement can provide a rough estimate of the fuel remaining in the tank, it is inaccurate under the best of conditions and is subject to many error-causing factors. The inherent inaccuracy is due to such things as the increasingly shallower tanks of present day vehicles, the irregular shapes of most tanks and the mechanical problems of the float/potentiometer combination. Variable factors include the effects of driving terrain and vehicle loading. With the use of a voltage or current meter as the readout device, there was no need or demand for precise measurement, but with the present day use of microprocessors and digital readouts, as well as the emphasis on fuel conservation, a more accurate measurement and readout are both possible and desirable. The same measuring arrangement can, of course, be applied to the measurement of the volume of a container, the volume of gas above a liquid in a container or the amount of liquid in a container. It would be desirable to have an arrangement which can very simply be adapted to different sizes of container. It would also be desirable to additionally provide an indication when the container is left uncapped. Additionally, it would be desirable to utilize a basic liquid volume measurement to provide a corollary reading such as miles per gallon in a vehicle.

SUMMARY OF THE INVENTION

It is, therefore, an object of the present invention to provide a highly accurate measurement of the volume of gases in a container.

It is an additional object to utilize such a measurement in terms of liquid in the container.

It is a particular object to provide such a measurement of the instantaneous liquid volume on a continuing basis and under all conditions.

It is another object to provide such a measuring scheme which is easily adaptable to different containers.

It is still another object to provide a means of detecting when a container is open to the surrounding atmosphere.

It is yet another object to utilize the measurement of fluid level to provide a corollary reading of level change such as miles per gallon.

These objects and others which will become apparent are provided in an arrangement in accordance with the present invention wherein two transducers are mounted separately in the walls of a rigid-walled container and the outer side of each is enclosed in a relatively small housing, the air pressure in each housing being essentially the same as in the larger container. One transducer is driven at a low frequency, to produce sonic pressure waves in the gases contained in the container. The second transducer detects the pressure waves and produces an output signal which is a function of the volume of the gases. All effects of atmospheric pressure, temperature and humidity are canceled out since the "spring" of the cone suspension of the first transducer becomes essentially the compliance of the trapped air behind the cone. In addition, the frequency at which the driver transducer is driven should be low enough that air or gas pressure over the entire tank is essentially uniform; i.e., the wave length being much larger than the largest dimension of the container.

BRIEF DESCRIPTION OF THE DRAWING

FIG. 6 is a diagram of a complete system utilizing the invention.

DETAILED DESCRIPTION OF A PREFERRED EMBODIMENT

The measuring device described herein is adaptable to the measurement of both gas and liquid volumes, as will be apparent, but will be described generally in the environment of a fuel tank. Measurement of the fuel volume will be accomplished by measuring the volume of gas (air and fuel vapor) and calculating the volume of fuel.

Figure 1:
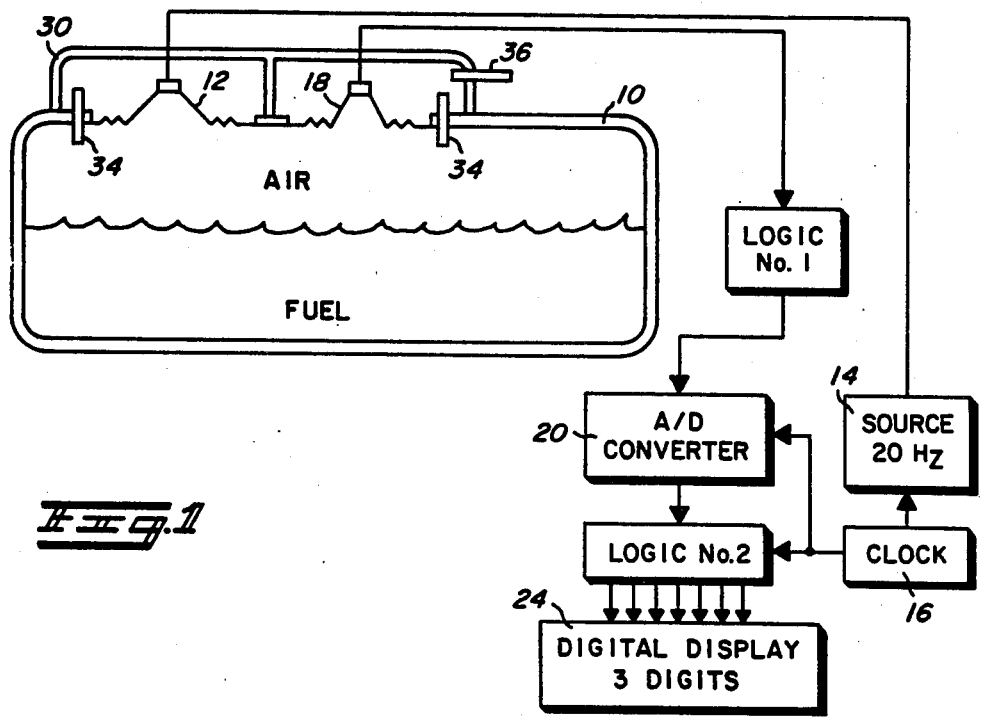
FIG. 1 is a cut-away view of the container arrangement combined with a block diagram of a logic circuit for measuring liquid volume.

As shown in FIG. 1, a fuel tank 10 has two transducers mounted within the trapped air space above the liquid fuel. One transducer is a driver 12 which is driven from a 20 Hz source 14, clocked by a clock 16. It is to be noted that the frequency value of 20 Hz is merely a typical value. The actual frequency will be determined by several parameters of the system. The second transducer is a sonic pressure sensor 18, the output of which is coupled through a logic block #1 to an A/D converter 20. In the logic block #1, the output signals from the sensor 18 are converted to the desired form. The digital output of the converter 20 would be coupled to a logic block #2 wherein the necessary calculations of volume would be made. The calculation could include determining the volume of gas by comparing the output of the A/D converter 20 with a reference number determined by the total tank volume, then subtracting volumes to obtain the volume of liquid in the tank. Thus, the same device can be utilized in different tanks by changing the reference number. The output of the logic block #2, representing liquid volume, can then be displayed by a digital readout device 24 such as an LED display. A typical display might have three digits, giving readings to the nearest tenth of a gallon. A housing 30, which may be divided as shown or may consist of two separate housings, encloses the backs of the transducers 12, 18. The volume of air contained in the housing 30 will normally be very small compared to the volume of the tank 10.

Figure 2:
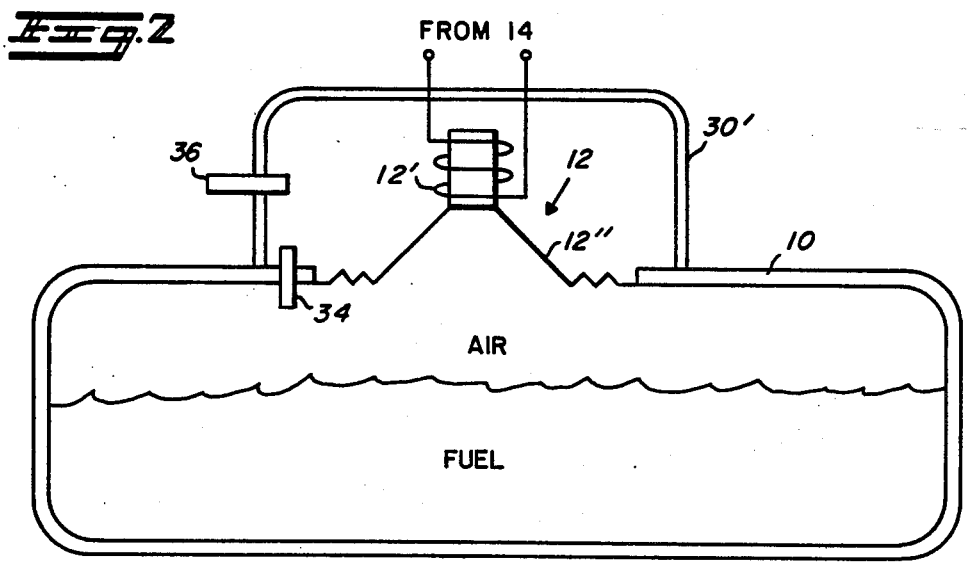
FIG. 2 is a simplified cut-away view of a tank with a driver transducer.

FIG. 2 shows the tank 10 with the driver transducer 12 mounted in a wall of the tank and with a small housing 30' enclosing the back of the transducer. The transducer 12, as shown here, might be a small speaker with a liquid-proof cone. When the speaker coil is driven, as by the 20 Hz source 14, the gas above the fluid in the tank is compressed and released in proportion to the total volume of gas. As a simplified example of this operating principle, a cork may be pushed down more easily into the neck of a nearly empty bottle than it can into a nearly full bottle.

Figure 3:
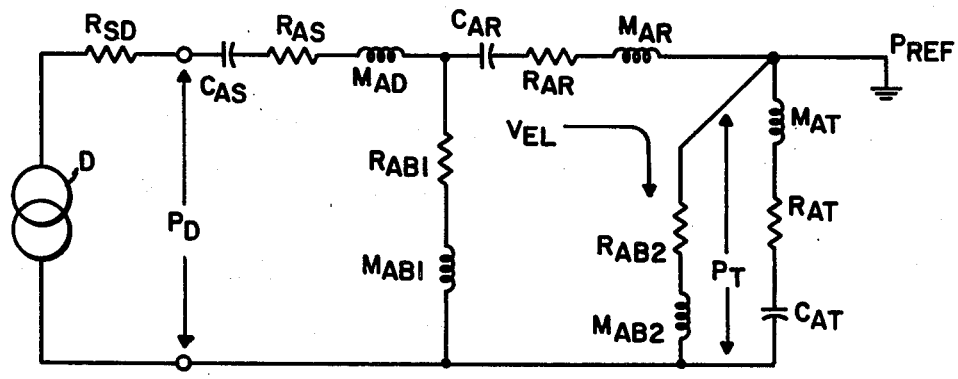
FIG. 3 is an equivalent circuit of the arrangement of FIG. 2.

FIG. 3 is an equivalent circuit for the arrangement of FIG. 2 with a current applied to the driver coil 12' of transducer 12. D represents the force produced by the driver coil and equals Bli where B is the speaker airgap flux density (Weber/m$^2$), l is the length of wire on the cone driver coil (meters), and i is the current in the coil (amperes). $R_{SD}$ is the damping resistance of the driver coil 12'. $C_{AS}$ is the acoustical compliance of the suspension of the cone 12" and $R_{AS}$ is the acoustical resistance. $M_{AT}$ is the equivalent acoustical mass of the air in the tank 10; $C_{AT}$ is the compliance. $R_{AT}$ is the acoustical resistance of the tank walls 10. $C_{AR}$ is the acoustical compliance of the air in the housing 30 and $M_{AR}$ is the equivalent acoustical mass. $R_{AR}$ is the acoustical resistance of the housing walls. $R_{AB1}$ and $M_{AB1}$ are the equivalent acoustical resistance and mass of the air bleed 34 between the tank 10 and the housing 30'. $R_{AB2}$ and $M_{AB2}$ are the equivalent acoustical resistance and mass of the air bleed 36 from the tank 10 to the outside air. $P_{REF}$ is the zero pressure or reference pressure at the tank walls and $P_D$, the pressure at the driver cone, is D/SD where SD is the area of the cone (meters$^2$). $P_T$ is the sound pressure in the tank. VEL indicates the volume velocity of the diaphragm (m$^3$/SEC).

Figure 4:
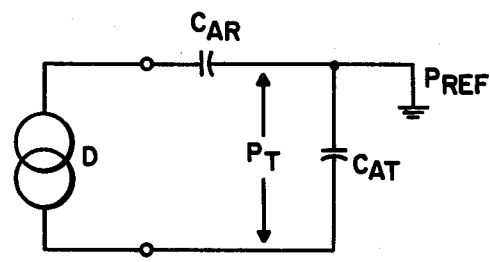
FIG. 4 is a simplified version of the equivalent circuit of FIG. 3 for optimized operating conditions.

If the driver D of FIG. 3 is driven from a constant current source, $R_{SD}$ approaches zero. If the air space in the speaker housing is very small compared to the volume of the tank, the reactance of the air compliance is large compared to $C_{AS}$, $M_{AD}$ and $R_{AS}$. If the frequency of the driver D is low enough so that the pressure over the internal surface of the tank is uniform, the reactance of $M_{AT}$ is small compared to $C_{AT}$. Also, if the tank walls are rigid enough so that essentially all of the energy of compression is reflected, $R_{AT}$ is small compared to the reactance of $C_{AT}$. Under these preferred operating conditions, the equivalent circuit becomes the simplified circuit shown in FIG. 4. The sound pressure $P_T$ can be shown to be independent of barometric pressure under these conditions and, since the volume of the tank is much larger than the volume of air behind the speaker, $P_T$ (BliV$_R$)/(S$_D$V$_T$). Thus, it may be seen that $P_T$ is inversely proportional to the volume of trapped air in the tank. If it is desired to use the device to measure the amount of liquid in a tank of known size, it is a simple matter to calculate the answer from an accurate measure of the air volume. Also, if the tank or container should be left open to the outside air, as by the gas tank cap being removed or not replaced, the volume of the tank $V_T$ would register as essentially infinite and this greater-than-maximum reading could be used to provide an indication thereof, such as an audio or visual alert signal.

Figure 5:
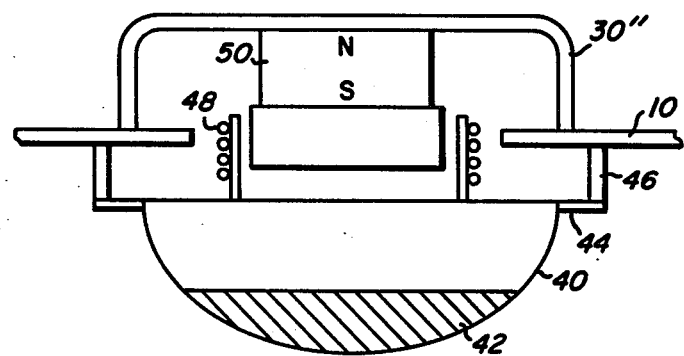
FIG. 5 is a cut-away view of a detail of a preferred embodiment.

The sensor diagram of FIG. 5 depicts one possible embodiment of the sensor 18 and shows a portion of the tank wall 10 and the housing 30" surrounding the back of the sensor 18. In this embodiment, the sensor utilizes a very small (on the order of one inch diameter) tweeter including a domed diaphragm 40 of aluminum or plastic with an added mass 42. A neoprene membrane 44 serves as a flexible connection to a rigid ring 46 which is mounted on the inner wall of tank 10. A voice coil 48 is attached to the membrane 44 and the magnetic field is supplied by a magnet structure 50 which may be supported by the housing 30".

An entire system for measuring liquid level or liquid volume is shown in FIG. 6. The low frequency source 14 is coupled through an amplifier stage 52 to the driver transducer 12 and to a multiplier stage 54 in the logic block #1. The pressure sensor 18, which may be similar to a condenser microphone, is also coupled to the logic block #1. The sensor 18 output signal is amplified in an amplifier 56, filtered in a narrow band pass filter 58, and multiplied by the signal from the source 14 in the multiplier 54. The multiplier 54 output signal is then filtered in a DC filter (0–1 Hz) 62 and coupled to a combining circuit 64. The combining circuit also receives a linearity reference signal from a linearity control 66. It is to be noted that, while a battery 68 is shown as the DC source for the linearity control and also for a zero set control 70, it may be desirable to derive the DC source from the driver 14 signal (rectified). The output signal of the combining circuit 64 is coupled to a divider 72 for division by a reference signal from a maximum volume reference source 74. The output signal from the divider 72 is coupled to a combining circuit 76 which also receives a zero volume reference signal from the zero reference set control 70.

The output signal of the logic block #1 is thus a function of the measured volume of liquid in a tank of known size. This output signal could be coupled directly to a logarithmic meter 80. However, the increased accuracy of measurement of this system would be better utilized by a digital volt meter. As is known in the art, such a meter may include the A/D converter 20, the logic block #2 and the display 24. The converter 20 could be an integrated circuit such as the Motorola MC1505. The logic block #2 could comprise a digital logic subsystem such as the Motorola MC14435 with a BCD-to-seven segment latch/decoder/driver such as the Motorola MC14511. Other digital readout circuits could, of course, be utilized.

The signal at the output of the combiner 76 is proportional to the volume of gases in the tank 10. If that signal is termed $E_g$, then $E_g = C_1(V_g - V_0)/V_0 + C_2$ where $V_g$ is a voltage proportional to the force on the driver cone 12" and is adjusted by the linearity control 66. $V_0$ is the output signal from the sensor 18. $C_1$ is a constant voltage established by the maximum volume reference source 74, and $C_2$ is a constant voltage established by the zero set control 70. It will be apparent that, since the volume of liquid equals the volume of the tank minus the measured volume of gases, the setting of $C_2$ can include this substraction function. It is also to be noted that if the volume of the housing 30" is much less than the minimum volume of gases in the tank 10; for example, the expansion space in the tank, the function of the combining circuit 64 may not be needed since $V_o$ will then be much smaller than $V_g$, making $V_g - V_o$ essentially equal to $V_g$.

The signal from the combining circuit 76 could also be used in combination with other signals relating to other parameters such as in obtaining a continuous miles-per-gallon reading for a vehicle engine by coupling the signal from the combining circuit to a differentiator circuit 84. The output signal of the differentiator, the rate of change of volume of liquid, could be coupled to a divider circuit 86 and divided therein by a signal from a velocity detector 88 (as used in a speedometer). The output of the divider 88 will therefore be function of Vel./(dVol./dt) and can be displayed in a miles-per-gallon indicator 90.

Another way in which the measurement of volume can be utilized is to measure the miles traveled between a pair of predetermined volume levels (such as 10 gal., 9 gal.), to calculate the miles-per-gallon for that volume difference, and to display that figure until the next calculation is made (for the values 9 gal., 8 gal.).

Thus, there has been shown and described a system capable of measuring gas volume, liquid volume, rate of change of liquid volume and miles traveled for a set volume of liquid (fuel) used. Other modifications and variations of the invention are possible and it is intended to cover all such as fall within the spirit of scope of the appended claims.

What is claimed is:

1. A device for measuring the volume of gases in a rigid-walled container of known size and comprising:
   first transducer means mounted in a wall of the container for providing cyclic pressure waves in said gases:
   second transducer means for sensing said cyclic pressure waves and providing a sensing signal in response to the instantaneous values of the pressure thereof;
   logic means coupled to the second transducer means for translating the sensing signal into a function of gas volume in the container and including detector means for providing a first D.C. signal in response to the amplitude of the sensing signal, first reference means for providing a first D.C. reference signal proportional to the force applied to the first transducer means, second reference means for providing a second D.C. reference signal determined by the maximum volume of said container, and third reference means for providing a third D.C. reference signal for establishing a zero gas volume setting.

2. A device in accordance with claim 1 and further including a first housing means for enclosing the exterior of the first transducer means, and a second housing means for enclosing the exterior of the second transducer means, the first and second housing means being substantially smaller than the container, and further including means for maintaining the quiescent gas pressure in the first and second housing means at essentially the pressure of the gases in the container.

3. A device according to claim 2 and further including means for maintaining the quiescent gas pressure in the container at essentially the pressure of the surrounding atmosphere.

4. A device according to claim 1 wherein the logic means includes means for translating the signal which is a function of gas volume to a signal which is a function of volume of liquid in the container.

5. A device according to claim 4 wherein the device is retained in a vehicle and the device further includes input means for providing an input signal proportional to the velocity of the vehicle, and second logic means for receiving the signal which is a function of the liquid volume in the container and the input signal proportional to velocity and providing an output signal proportional to the ratio of the distance traveled by the vehicle in a given period of time to the change of liquid volume during said period.

6. A device in accordance with claim 1 and wherein the logic means further includes means for adjusting the linearity of the sensing signal with respect to the rate of change of liquid volume in the container.

7. A device according to claim 1 wherein the logic means includes means for providing an indicating signal when the volume of gases in the container is sensed to be greater than the volume of the container.

* * * * *